United States Patent Office 2,877,244

Patented Mar. 10, 1959

2,877,244

UNSATURATED ACYL ISOTHIOCYANATES AND METHOD OF MAKING THE SAME

Günther Nischk, Leverkusen, and Hans Holtschmidt, Koln-Stammheim, Germany, assignors to Farbenfabriken Bayer Aktiengesellschaft, Leverkusen, Germany, a corporation of Germany No Drawing. Application May 22, 1957
Serial No. 660,753

Claims priority, application Germany June 16, 1956

9 Claims. (Cl. 260—402.5)

This invention relates to novel unsaturated acyl isothiocyanates and to a method of making the same. More particularly, the invention is concerned with a novel class of chemical compounds having one or more polymerizable ethylenically unsaturated carbon-to-carbon double bonds in their molecules together with an NCS-group attached to a carboxyl group.

Unsaturated isothiocyanates the NCS-groups of which being attached to a hydrocarbon radical have been known for a relatively long time. They can, for instance, be produced by the action of thiophosgene on unsaturated amines such as allyl amine. Furthermore, it is known to split thioureas with concentrated acids or to split off hydrogen halide from saturated isothiocyanates containing halogen. Another class of unsaturated isothiocyanates the NCS-groups of which being attached to aromatic rings can be produced for instance, by a method disclosed in our co-pending U. S. patent application Serial No. 555,743, filed December 28, 1955. According to the procedure claimed with that application unsaturated acyl halides are condensed with hydroxy aryl isothiocyanates.

It is an object of the present invention to provide aliphatic unsaturated isothiocyanates which have polymerizable ethylenically unsaturated carbon-to-carbon double bonds.

Another object is to provide unsaturated isothiocyanates which may be copolymerized with vinyl or allyl compounds and reacted with compounds having active hydrogen to give useful plastics. A further object is to provide a process for preparing the unsaturated acyl isothiocyanates. Still further objects will appear hereinafter.

It has now been found that unsaturated acyl isothiocyanates can be produced in a good yield if aliphatic unsaturated acyl halides are reacted in inert organic media with inorganic thiocyanates.

The reaction of the present invention proceeds in accordance with the following equation:

$$RCOX+A—SCN=XA+R—CONCS$$

in which R is an aliphatic radical with polymerizable ethylenically unsaturated carbon-to-carbon double bonds, X is chlorine, bromine or iodine and A is a metal or an inorganic cationic group such as ammonium.

Illustrative examples of aliphatic unsaturated acyl halides which may be used in the practice of the invention include acrylic acid chloride, acrylic acid bromide, acrylic acid iodide, methacrylic acid chloride, methacrylic acid bromide, methacrylic acid iodide, crotonic acid chloride, crotonic acid bromide, crotonic acid iodide. Further examples are the chlorides, bromides and iodides of sorbic acid, cyano sorbic acid, chloracrylic acid, cyano acrylic acid, methyl crotonic acid, oleic acid or pentane-5-carboxylic acid.

Representatives of inorganic thiocyanates are, for instance, sodium thiocyanate, potassium thiocyanate, calcium thiocyanate, strontium thiocyanate, magnesium thiocyanate, ammonium thiocyanate, lead thiocyanate, ferric thiocyanate, cuprous thiocyanate, aluminum thiocyanate and silver thiocyanate.

In carrying out the process of the invention, the above-defined unsaturated aliphatic acyl halides are brought together with the inorganic thiocyanate in an inert solvent in an equimolar or nearly equimolar amount. In some instances, however, it is preferred to employ an excess of inorganic thiocyanates in order to obtain better yields. Organic solvents which can be employed in the process of the invention and which will not react with the acyl thiocyanates produced by the process include benzene, toluene, acetone, tetrahydrofurane, dioxane, methyl ethyl ketone, diallyl ketone, diisopropyl ketone and cyclohexanone.

Since the novel unsaturated acyl isothiocyanates can polymerize even while they are being produced owing to their activated double bond it is preferred to carry out the reaction in the presence of polymerization stabilizers. As polymerization stabilizers any stabilizer known in the polymerization technique can be used. Examples of suitable compounds of this kind are pulverulent copper, copper salts such as copper oleate, sulfur, quinone, quinhydrone, phenthiazine, the diacetate of thiodiglycol and the diethyl ester of thiodibutyric acid.

The reaction between the acyl halide and the inorganic thiocyanate is exothermic. The reaction is therefore started preferably at room temperature. When the temperature rises up to the boiling point of the solvent external cooling may become necessary. According to a preferred embodiment reaction is performed under reflux.

The novel unsaturated acyl isothiocyanates can be prepared, for example, in the following manner:

The acyl halide is introduced with stirring into a suspension of a powdery inorganic thiocyanate in an inert organic medium. An appreciable rise in temperature then occurs. After all, the unsaturated acyl halide has been added. The mixture is preferably stirred for several more hours at reflux temperature. After cooling the inorganic precipitate which has formed can be filtered off with suction or washed out with water. The isothiocyanate which is obtained is thereafter distilled off in vacuo.

The novel compounds are colorless to slightly yellow liquids which can easily be distilled in vacuo. The smooth progress of the reaction according to the present invention was not to be expected since there was a strong possibility of the NCS-group being added to the activated double bond of the unsaturated halide or acyl isothiocyanate, especially, as the reaction is usually carried out at an acid pH value.

The novel aliphatic ethylenically unsaturated acyl isothiocyanates are suitable as intermediate products for the production of plastics and pharmaceutical products. Thus, for instance, they can be copolymerized with other known unsaturated vinyl or allyl compounds such as vinyl chloride or styrene. The copolymers obtained can be reacted in a second phase with compounds containing active hydrogen atoms to give valuable high molecular weight plastics. Another utility of the products of the invention is to copolymerize the unsaturated acyl isothiocyanates with oxypyrrolidones to produce high molecular weight blood detoxicating agents.

The following examples illustrate the process of the invention without in any way limiting it. Parts given are parts by weight.

*Example 1*

100 parts of potassium thiocyanate are finely ground and suspended in 400 parts of acetone by stirring. 0.5 part of phenthiazine is added to prevent polymerization.

105 parts of methacrylic acid chloride are then added dropwise. During this reaction, the temperature quickly rises to 50° C. The temperature is maintained for another 2 hours at 50° C. and the mixture is mixed with 500 parts of benzene and 1000 parts of water after cooling. The organic phase is separated, washed neutral several times with sodium chloride solution and dried with sodium sulphate. After the drying operation, the benzene is driven off in vacuo. The residue is distilled in a water jet vacuum.

B. P. $_{18\,mm.}$ 60° C. Yield 110 parts.

*Example 2*

170 parts of potassium thiocyanate are stirred with 800 parts of acetone, as described in Example 1. 170 parts of crotonic acid chloride are now added dropwise. The mixutre is thereby heated to 50° C. It is stirred for another 2 hours at this temperature, diluted after cooling with 800 parts of benzene and 1500 parts of water and the organic phase is separated out. After washing several times with sodium chloride solution, the substance is dried with sodium sulphate and then the benzene is distilled off at reduced pressure. The residue is subjected to distillation in a water jet vacuum:

B. P. $_{17\,mm.}$ 78–80° C. Yield 205 parts.

*Example 3*

90 parts of powdered and dried sodium thiocyanate are suspended in 400 parts of benzene containing 0.5 part of phenthiazine. 87 parts of acrylic acid chloride are then added dropwise while stirring, the temperature quickly rising to 50° C. The mixture is stirred for another 2 hours at this temperature. After cooling, the substance is mixed with 400 parts of benzene and filtered with suction from the separated potassium chloride. 102 parts of acryloyl isothiocyanate are obtained by distillation.

B. P. $_{25\,mm.}$ 56–58° C.

*Example 4*

300 parts of oleic acid chloride are dropped into a suspension of 55 parts of magnesium thiocyanate in 800 parts of benzene. The temperature slowly rises and the mixture is stirred for another 2 hours at 60° C. The reaction mixture is filtered with suction while still being hot. The residue is washed out with benzene. The benzene of the benzene solution of oleic acid isothiocyanate is driven off in a water jet vacuum. 250 parts of oleic acid isothiocyanate are obtained as a pale yellow oil.

*Example 5*

175 parts of sorbic acid bromide are dropped into a suspension of 190 parts of lead thiocyanate in 800 parts of diethyl ketone. Lead bromide is precipitated while the temperature rises. The reaction mixture is stirred for another hour at 60° C. and then poured into water. The sorbic acid isothiocyanate which is separated out is dissolved in benzene and washed neutral with water. The benzene solution is dried with sodium sulfate and the solvent driven off in a water jet vacuum. The residue is distilled in a high vacuum. There are obtained 100 parts of the nearly colorless sorbic acid isothiocyanate.

While certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. Compounds having the formula RCONCS, wherein R represents the radical of an ethylenically unsaturated hydrocarbon derived from a fatty acid.

2. A process for the production of compounds having the formula RCONCS, wherein R represents the radical of an ethylenically unsaturated hydrocarbon derived from a fatty acid which comprises reacting halides of organic carboxylic acids containing polymerizable ethylenically unsaturated carbon-to-carbon double bonds with inorganic thiocyanates.

3. A process for the production of compounds having the formula RCONCS, wherein R represents the radical of an ethylenically unsaturated hydrocarbon derived from a fatty acid which comprises reacting in inert organic media halides or organic carboxylic acids containing polymerizable ethylenically unsaturated carbon-to-carbon double bonds with inorganic thiocyanates.

4. A process for the production of compounds having the formula RCONCS, wherein R represents the radical of an ethylenicaly unsaturated hydrocarbon derived from a fatty acid which comprises reacting in the presence of polymerization stabilizers and in inert organic media halides of organic carboxylic acids containing polymerizable ethylenically unsaturated carbon-to-carbon double bonds with inorganic thiocyanates.

5. Methacrylic acid isothiocyanate

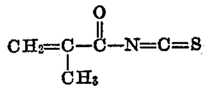

6. Crotonic acid isothiocyanate

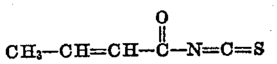

7. acryloyl isothiocyanate

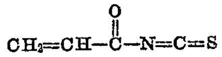

8. Oleic acid isothiocyanate $$CH_3(CH_2)_7CH{=}CH(CH_2)_7CONCS$$

9. Sorbic acid isothiocyanate

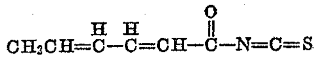

No references cited.